W.-S. ROBINSON.
INSECT TRAP.
APPLICATION FILED MAR. 22, 1911.
1,009,580.
Patented Nov. 21, 1911.
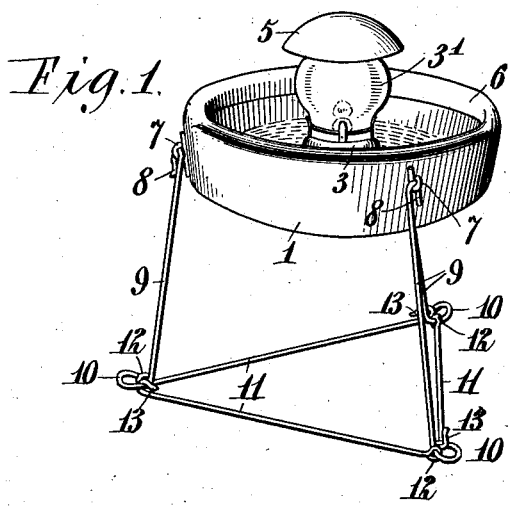
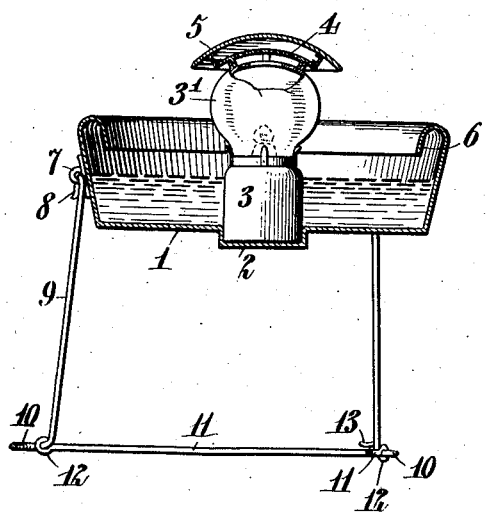
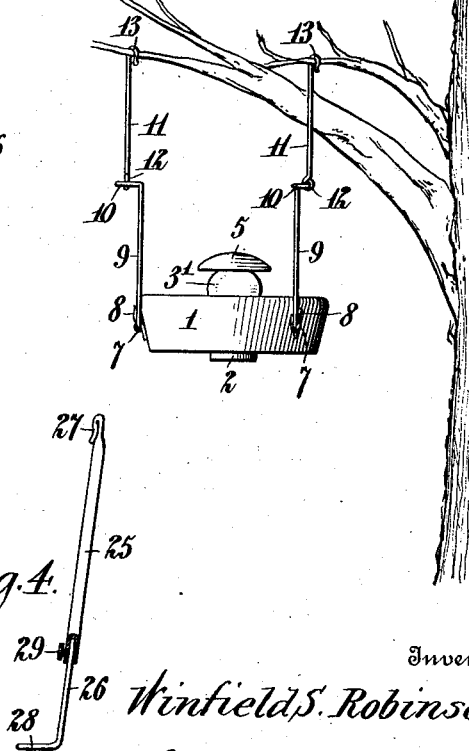
Witnesses:
Chrust Feinle, Jr.
Inventor,
Winfield S. Robinson.
By Victor J. Evans.
Attorney.

UNITED STATES PATENT OFFICE.

WINFIELD S. ROBINSON, OF HARTFORD, MAINE.

INSECT-TRAP.

1,009,580.  Specification of Letters Patent.  Patented Nov. 21, 1911.

Application filed March 22, 1911. Serial No. 616,120.

*To all whom it may concern:*

Be it known that I, WINFIELD S. ROBINSON, a citizen of the United States, residing at Hartford, in the county of Oxford and State of Maine, have invented new and useful Improvements in Insect-Traps, of which the following is a specification.

This invention relates to insect destroyers, the object being to provide a simple, inexpensive and efficient device which will attract and destroy insects—such as moths, millers, beetles, and such insects as infest and destroy fruits and plants.

Further objects and advantages of the invention will appear in the following description, and the novel features thereof will be particularly pointed out in the claim, it being understood that various changes in form, proportion and such minor details of construction as fall within the scope of the appended claim may be resorted to if desired.

In the drawings—Figure 1 is a perspective view of an insect destroyer constructed in accordance with the present invention. Fig. 2 is a vertical longitudinal and sectional view through the same. Fig. 3 is a detail view illustrating the manner of suspending the device from the limb of a tree. Fig. 4 is an elevation partly in section of a modified form of one of the leg or supporting members.

The improved device consists of a pan or casing 1. This pan is preferably of a rounded formation and having its sides slightly inclined from its bottom toward its open top. The bottom of the pan is preferably centrally provided with an annular depression 2, the same adapted to receive the base portion of the reservoir of a lamp 3. The globe of this lamp is rounded or cone shaped as designated by the numeral 3', and the open top of the said globe is provided with a spaced perforated curved plate 4 having secured thereto and spaced away therefrom a curved shield 5. The perforated plate 4 is adapted to provide means whereby a sufficient amount of air will be delivered to the interior of the globe and at the same time to serve as a protector for the upper portion of the said globe. The non-reticulated plate 5 is adapted to serve as both a wind and a rain shield for the lamp. The upper portion of the pan or receptacle 1 has its edges inturned and bent downwardly to provide an annular flange 6. This flange is spaced away from the sides of the receptacle a suitable distance, and the said flange is adapted to serve as a means for preventing the escape of insects which are attracted by the light of the lamp and which being dazzled thereby fall within the pan or receptacle. The receptacle is adapted to contain a fluid of a sufficient strength to destroy the insects. From practice it has been found that a saponaceous substance made from the ordinary soap and water is sufficient to accomplish this purpose.

The side of the rounded pan 1 is provided with spaced eyes 7, preferably three in number, and these eyes are adapted to receive hooked ends 8 of the leg or supporting members 9. These supports 9 are each constructed of a single strand of wire of a sufficient strength to effectively support the receptacle, but which at the same time are susceptible to bending, so that when the device is positioned upon an uneven surface one or more of the said legs may be bent to shorten the same and to allow the receptacle to be retained in a substantially horizontal position. Each of the wire leg members has its lower extremity formed with an off-set outwardly extending coil 10, the said coil providing the feet for the legs. The numerals 11 designate leg retaining as well as supporting elements for the receptacle when the latter is suspended from a tree as illustrated in Fig. 3 of the drawings. These elements 11 are each constructed of a single strand of wire, and each has one of its ends formed with an eye 12 which engages with the off-set foot of one of the legs. The opposite end of the element 11 is bent to provide a hook 13, and this hook, when the device is in the position illustrated in Figs. 1 and 2 of the drawings, is adapted to engage the looped or coiled foot of the adjacent leg member.

From the above it will be noted that the legs may be readily separated from the pan or receptacle when desired, that the legs effectively support the pan, and that the elements 11 brace and sustain the said legs.

It will be further noted that the elements 11 serve as effective means for sustaining the destroyer from the limbs of a tree, and this feature is highly desirable when the insects take to the trees for breeding.

In Fig. 4 I have illustrated a leg lever comprising a pair of elements 25 and 26.

The element 25 has its upper extremities formed with a hook 27. The element 25 is hollow and is adapted to receive the element 26. The element 26 has its lower extremity formed with an off-set foot 28 and the sleeve or element 25 has a front opening adapted to receive a thumb bolt 29 which contacts with element 26 in an adjusted position with relation to the element 27.

Having thus fully described the said invention, what I claim is:—

In a device for the purpose set forth, a receptacle having its upper end formed with an inturned downwardly extending continuous flange, the bottom of said receptacle being adapted for the reception of a light radiating element, curved protecting shields for the element, eyes upon the side of the receptacle, legs, said legs each constructed of a single strand of bendable wire, one of the ends of each of the legs being bent to provide hooks adapted to engage the eyes of the receptacle, the lower extremity of each of the legs being formed with an off-set loop, a wire element having an eye connected with each of the said loops, the opposite end of each of the wire elements being bent to provide a hook, substantially as and for the purpose set forth.

In testimony whereof I affix my signature in presence of two witnesses.

WINFIELD S. ROBINSON.

Witnesses:
   OTIS M. RICHARDSON,
   NATHAN REYNOLDS.

---

Copies of this patent may be obtained for five cents each, by addressing the "Commissioner of Patents, Washington, D. C."